United States Patent [19]
Kammel et al.

[11] Patent Number: 5,593,233
[45] Date of Patent: Jan. 14, 1997

[54] RADIALLY AND AXIALLY LOADABLE BUSH BEARING FOR CHASSIS PARTS IN MOTOR VEHICLES

[75] Inventors: Helmut Kammel, Damme; Jürgen Weitzmann, Neuenkirchen, both of Germany

[73] Assignee: Lemfürder Metallwaren AG, Lemförder, Germany

[21] Appl. No.: 507,813

[22] Filed: Jul. 27, 1995

[30] Foreign Application Priority Data

Aug. 17, 1994 [DE] Germany .................... 44 29 102.7

[51] Int. Cl.$^6$ .................................................. F16C 27/06
[52] U.S. Cl. .................................... 384/222; 384/275
[58] Field of Search .................................... 384/222, 220, 384/223, 275, 296, 300

[56] References Cited

U.S. PATENT DOCUMENTS

| | | | |
|---|---|---|---|
| 4,744,677 | 5/1988 | Tanaka et al. | 384/222 |
| 4,809,960 | 3/1989 | Kakimoto et al. | 384/222 |
| 5,165,803 | 11/1992 | Zivkovic | 384/222 |
| 5,261,748 | 11/1993 | Kameda | 384/222 |

*Primary Examiner*—Lenard A. Footland
*Attorney, Agent, or Firm*—McGlew and Tuttle

[57] ABSTRACT

The present invention pertains to a radially and axially elastic slide bush bearing for chassis parts in motor vehicles with thrust bearings between an inner pipe (1) and an outer bush (2) and with an elastomer body (4) surrounding the outer bush (2). To obtain a one-part design, a thrust bearing transmitting axial forces, consisting of a disk (8 and 9) and an abutment (10 and 11), is provided with a sealing lip (12 and 13) surrounding this thrust bearing at both axial bearing ends, wherein the thrust bearing has a smaller diameter compared with the diameter of the bearing eye in the chassis part (5) at one bearing end in the external diameter of the sealing lip (13) axially surrounding the thrust bearing.

7 Claims, 3 Drawing Sheets

स5,593,233

RADIALLY AND AXIALLY LOADABLE BUSH BEARING FOR CHASSIS PARTS IN MOTOR VEHICLES

FIELD OF THE INVENTION

The present invention pertains to a radially and axially loadable bush bearing for chassis parts in motor vehicles including an inner pipe which can be rigidly mounted to a first vehicle part, an outer bush that can be arranged on the inner pipe, without clearance, in a slightably rotatable manner, a clearance-free thrust bearing between the inner pipe and the outer bush, an elastomer surrounding the outer bush that can be pressed into a bearing eye of a second chassis part and extends between the radial flange and the thrust bearing and has a sealing lip which is made in one piece with the elastomer body and extends axially over the thrust bearing and is directed toward the center of the bearing.

BACKGROUND OF THE INVENTION

A similar bush bearing has been known from DE 40 36 050 -C1. A split design is needed to install it in a bearing eye of a chassis part and to obtain a symmetrical bearing design, so that two such bush bearings are pushed into the bearing eye of the metallic chassis part from mutually opposite sides and then tensioned against each other by means of a bearing bolt inserted into the inner pipe of the two bearing parts. As a result, the support rings of the two bearing parts lie against the edge of the bearing eye on one side each with their radial flange. Thus, two bush bearings are needed for each complete bearing assembly, which increases the manufacturing costs, but also the cost of series assembly and the cost of supplying the bush bearings.

SUMMARY AND OBJECTS OF THE INVENTION

The primary object of the present invention is therefore to simplify a bush bearing for chassis parts in motor vehicles in terms of its manufacturing and assembly costs by reducing the number of parts necessary for a complete bush bearing.

According to the invention, a radially and axially loadable slide bush bearing for chassis parts in motor vehicles is provided including an inner pipe rigidly mounted to a first vehicle part. An outer bush is arranged on the inner pipe without clearance a thrust bearing is disposed adjacent the inner pipe and the outer bush. An elastomer body is provided adhesively surrounding the outer bush. The elastomer body is axially pressed into a bearing eye of a second vehicle chassis part. The elastomer body extends between a radial flange and the thrust bearing. The elastomer body has a sealing web formed integrally with the elastomer body. The elastomer body extends axially over the thrust bearing and extends in the direction of a center of the bearing. The thrust bearing includes axially force transmission means including the sealing lip surrounding the thrust bearing, at each of first and second axially bearing ends. At least one of the two thrust bearings has a diameter which is smaller compared to a diameter of a bearing eye portion of the external diameter of the sealing lip surrounding the thrust bearing.

Such a bush bearing has a one-part design; it can be mounted in the bearing eye of a metallic chassis part, and it is able to transmit both radial forces and axial forces in both directions. To transmit possible axial forces in the opposite direction, the elastomer body is provided with a circumferential annular ring, which extends behind the edge of the bearing eye on the opposite side of the chassis part. A circumferential groove is preferably provided at the transition of the elastomer body to the sealing lip, which is made in one piece with the elastomer body and of the same material at the bearing end, whose diameter is smaller than that of the bearing eye, as a result of which it is achieved that stresses caused by forces acting on the bearing due to assembly operations or during the operation in the material of the elastomer body will not be transmitted to the area of the sealing lip, so that leakages in the seal will be avoided.

Both thrust bearings of the bush bearing consist of a disk supported by an axial end of the outer bush and an abutment fastened to the axial end of the inner pipe, and the two abut each other with a radially extending sliding surface, which may optionally be coated with a material possessing good sliding properties.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE PREFERRED EMBODIMENTS

Figure 1:
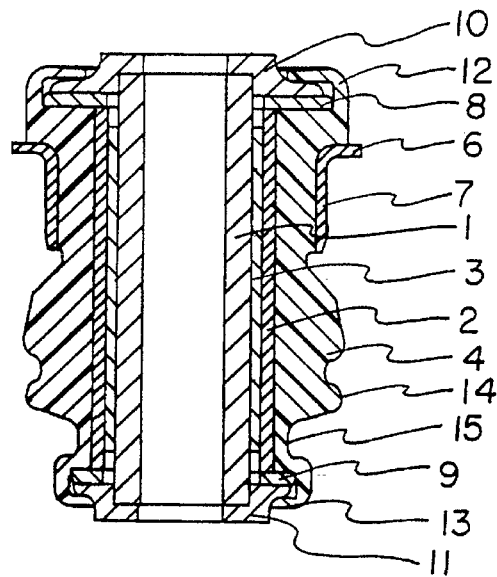
FIG. 1 is a sectional view in an axial plane through a bush bearing before mounting in a bearing eye of a chassis part.

The bush bearing is comprised of an inner pipe 1, an outer bush 2 arranged thereon without clearance and in a slidingly rotatable manner, wherein a slide bush 3, which increases the sliding properties of the bush bearing and is made of a material possessing good sliding properties, may optionally be provided between the two, or in the alternative only a coating improving the sliding properties is provided. The outer bush 2 is adhesively arranged in an elastomer body 4 completely surrounding same. Corresponding to the desired elasticity characteristics of the bush bearing, the elastomer body 4 has a circumferential profiling, shown in FIG. 1. The elastomer body 4 can be pressed into the bearing eye of a chassis part 5 from one side, after which it is supported with the radial flange 6 of a support ring 7 on one side of the chassis part 5 against the edge of the bearing eye. The support ring 7 is also adhesively connected, e.g., vulcanized, to the elastomer body 4. Thrust bearings for transmitting axial forces are provided at both axial ends. Each of the two thrust bearings is comprised of a respective disk 8 and 9, which are supported against the axial end of the outer bush 2, and a respective abutment 10, 11 fastened to the axial end of the inner pipe 1, so that the sliding disk 8 with the abutment 10 and the sliding disk 9 with the abutment 11 have a common sliding surface each, which may optionally also be coated with a material possessing good sliding properties. With a respective sealing lip 12 and 13 made in one piece and of the same material, the elastomer body 4 extends at both axial ends over both the respective thrust bearing 8, 10 and the respective thrust bearing 9, 11. The respective thrust bearing 8, 10 arranged on the side of the support ring 7 is of the conventional design, so that the disk 8 has a larger diameter than the support ring 7, as can be recognized from the drawing. At the opposite axial end, the respective thrust bearing 9, 11 with the sealing lip 13 surrounding these parts has a smaller diameter compared with the internal diameter of the bearing eye in the chassis part 5. It becomes possible as a result to preassemble the bush bearing in its entirety corresponding to the representation in FIG. 1 and to press it into the bearing eye of the motor vehicle part 5 from one side. Axial forces are transmitted by the support ring 7 with the radial flange 6 onto the motor vehicle part 5 in the principal direction of load. Possible axial forces in the opposite direction (opposite to the principal direction of load, opposite the direction corresponding to the direction of insertion) are transmitted by an annular ring 14, which is arranged at the end of the elastomer body 4 and extends behind the edge of the bearing eye in the chassis part 5 at the axial end located opposite the support ring 7, as is shown in FIG. 2. The bush bearing is connected to the second chassis part in the known manner by a bolt that can be inserted into the inner pipe.

A circumferential groove 15 is provided at the bearing end with the smaller diameter compared with the diameter of the bearing eye at the transition of the elastomer body 4 to the sealing lip 13 made in one piece with it from the same material. This groove 15 prevents the transmission of possible stresses in the elastomer body onto the area of the sealing lip, and thus it ensures a better sealing at the ends of the bearing, as was mentioned above.

Figure 2:
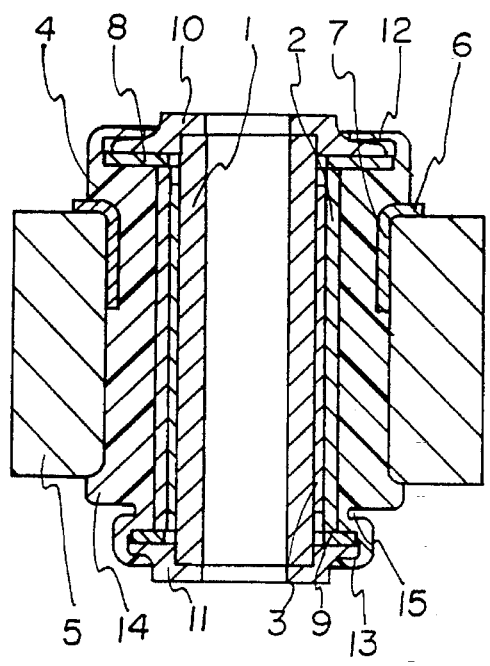
FIG. 2 is a sectional view corresponding to FIG. 1 after the mounting.
Figure 3:
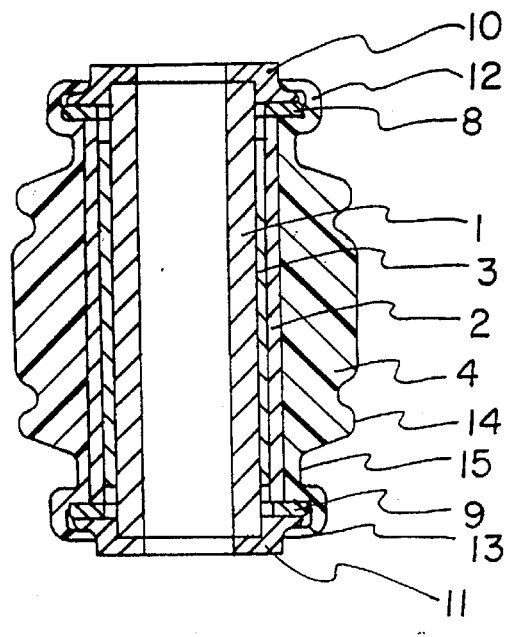
FIG. 3 is a sectional view of a variant of the invention in which the thrust bearings have the same external diameter at two bearing ends (the diameter being smaller than the diameter of the bearing eye)

In a variant of the arrangement according to FIG. 1, FIG. 3 shows a bearing, in which the thrust bearings have the same external diameter at the two bearing ends. Two annular rings 14 are provided arranged as an end part of the elastomer body 4.

Figure 4:
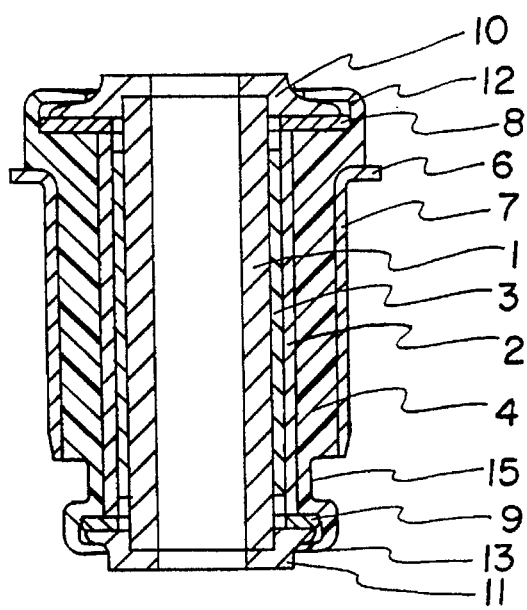
FIG. 4 is a sectional view similar to FIG. 1 showing a variant of the invention with a continuous outer sleeve.

FIG. 4 shows the design of a bearing as in FIG. 1 but with a continuous outer sleeve 7 instead of a shortened design corresponding to FIG. 1 in a bearing with thrust bearings with different diameters. A radial flange ring 6 is arranged on the side of the larger diameter, so that the bearing with the opposite bearing side can be mounted into the bearing eye of a motor vehicle part in advance.

Figure 5:
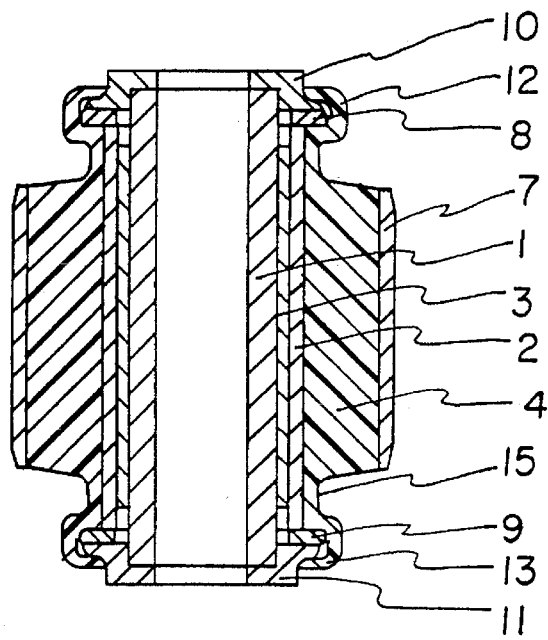
FIG. 5 is a sectional view similar to FIG. 1 showing a variant of the invention or in both thrust bearings have the same diameter (smaller than the diameter of the bearing eye portion.
Figure 6:
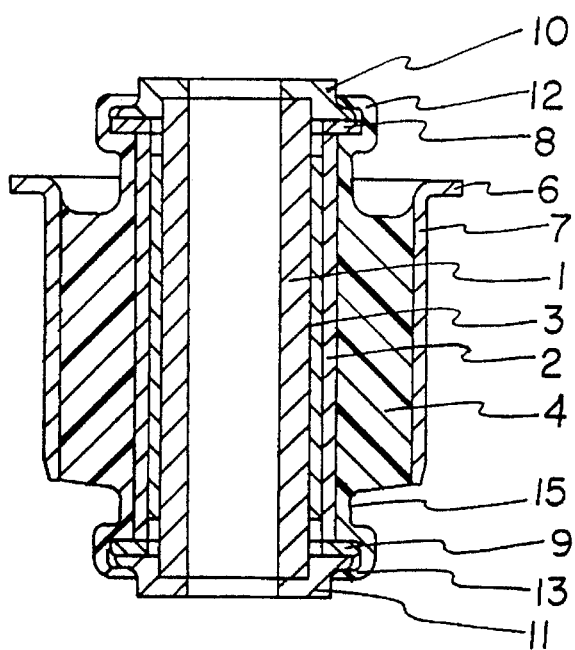
FIG. 6 is a sectional view similar to FIG. 5, showing an outer sleeve with radial flange.

In the bearing design according to FIG. 5, both thrust bearings have the same diameter, and the transmission of axial forces is limited to the permissible shear stresses in the elastomer body 4. The design according to FIG. 6 differs from this in that a radial flange 6, by which fixation of the bearing during mounting is also achieved at the same time, is provided at one end of the outer sleeve 7 surrounding the elastomer body.

While specific embodiments of the invention have been shown and described in detail to illustrate the application of the principles of the invention, it will be understood that the invention may be embodied otherwise without departing from such principles.

What is claimed is:

1. A radially and axially loadable slide bush bearing for chassis parts in motor vehicles, including a first vehicle pan and a second vehicle part with a bearing eye portion, the slide bush bearing comprising:

an inner pipe rigidly mounted to the first vehicle part;

an outer bush arranged on said inner pipe, substantially without clearance between said outer bush and said inner pipe;

a first end thrust bearing disposed adjacent said inner pipe and said outer bush at a first axial end of said inner pipe;

a second end thrust bearing disposed adjacent said inner pipe and said outer bush at a second axial end of said inner pipe;

an elastomer body adhesively connected to said outer bush and surrounding said outer bush, said elastomer body being axially pressed into the bearing eye of the second vehicle chassis part, said elastomer body having a first axial end sealing lip and a second axial end sealing lip formed integrally therewith, said elastomer body extending axially over said thrust bearing and extending in the direction of a center of the bearing, said thrust bearings defining axial force transmission means including said first axial end sealing lips surrounding said first axial end thrust bearing, said second axial end sealing lips surrounding said second axial end thrust bearing, at least one of said two thrust bearings having a diameter which is smaller compared to a diameter of the bearing eye portion.

2. A bush bearing in accordance with claim 1, wherein an external diameter of said sealing lip surrounding said at least one of said two thrust bearings is smaller than an internal diameter of said bearing eye portion.

3. A bush bearing in accordance with claim 2, wherein a circumferential groove is defined at a transition between said elastomer body and said sealing lip, said sealing lip being formed of the same material as said elastomer body, at an axial end with a smaller diameter compared to said diameter of said bearing eye portion.

4. A bush bearing in accordance with claim 2, wherein said two thrust bearings each include a disk supported against an axial end of said outer bush and an abutment fastened to an axial end of said inner pipe, said abutment and said outer bush abut each other over a radially extending sliding surface.

5. A bush bearing in accordance with claim 4, wherein said radially extending sliding surface is coated with material possessing good sliding properties.

6. A bush bearing in accordance with claim 2, wherein said two abutments are fastened at axial ends of said one-part inner pipe and against a front end of said one-part outer bush.

7. A bush bearing in accordance With claim 2, further comprising a radial flange connected between an inner surface of said bearing eye portion and said elastomer body, said elastomer body extending between said radial flange and one of said thrust bearings.

* * * * *

UNITED STATES PATENT AND TRADEMARK OFFICE
CERTIFICATE OF CORRECTION

PATENT NO. : 5,593,233
DATED : January 14, 1997
INVENTOR(S) : KAMMEL et al.

It is certified that error appears in the above-indentified patent and that said Letters Patent is hereby corrected as shown below:

On the title page, correct the Assignee to read as follows:

--[73] Assignee: Lemförder Metallwaren AG, Lemförder, Germany

Signed and Sealed this

Fifteenth Day of April, 1997

Attest:

BRUCE LEHMAN

Attesting Officer

Commissioner of Patents and Trademarks